(12) United States Patent
Saraf et al.

(10) Patent No.: US 8,615,502 B2
(45) Date of Patent: Dec. 24, 2013

(54) METHOD OF AND SYSTEM FOR REVERSE MAPPING VNODE POINTERS

(75) Inventors: Suman Saraf, Haryana (IN); Sharad Agrawal, Haryana (IN); Vivek Srivastava, Uttar Pradesh (IN)

(73) Assignee: McAfee, Inc., Santa Clara, CA (US)

( * ) Notice: Subject to any disclaimer, the term of this patent is extended or adjusted under 35 U.S.C. 154(b) by 579 days.

(21) Appl. No.: 12/426,859

(22) Filed: Apr. 20, 2009

(65) Prior Publication Data

US 2013/0246393 A1    Sep. 19, 2013

Related U.S. Application Data

(60) Provisional application No. 61/124,731, filed on Apr. 18, 2008.

(51) Int. Cl.
*G06F 17/30* (2006.01)

(52) U.S. Cl.
USPC ............................ 707/694; 707/802; 707/822

(58) Field of Classification Search
USPC .......................................... 707/822, 694, 802
See application file for complete search history.

(56) References Cited

U.S. PATENT DOCUMENTS

| | | |
|---|---|---|
| 4,688,169 A | 8/1987 | Joshi |
| 4,982,430 A | 1/1991 | Frezza et al. |
| 5,155,847 A | 10/1992 | Kirouac et al. |
| 5,222,134 A | 6/1993 | Waite et al. |
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |
| 5,778,226 A | 7/1998 | Adams et al. |
| 5,778,349 A | 7/1998 | Okonogi |

(Continued)

FOREIGN PATENT DOCUMENTS

| | | |
|---|---|---|
| EP | 1 482 394 A2 | 12/2004 |
| EP | 2 037 657 A1 | 3/2009 |

(Continued)

OTHER PUBLICATIONS

Kurt Gutzmann, "Access Control and Session Management in the HTTP Environment," Jan./Feb. 2001, pp. 26-35, IEEE Internet Computing.

(Continued)

*Primary Examiner* — Son T Hoang
(74) *Attorney, Agent, or Firm* — Patent Capital Group (57) ABSTRACT

Embodiment of the invention provide a reverse name lookup function for providing an absolute path name or file name and absolute path name to the file name parent directory based on a vnode reference, NFS file handle reference, or file identifier reference associated with a computer virtual file system. A method in accordance with the invention comprises populating a table structure with vnodes, names, and absolute path information associated with the vnodes. The table structure and information are sufficient to generate an absolute path name and file name for each vnode. The table structure also includes entries for file identifiers, names, and associated absolute path information associated with the file identifiers. This information is sufficient to generate an absolute path name for each file identifier. The table is populated by hooking virtual file system function calls including the vnode name lookup function and the vnode inactive function. The table is populated with the file identifier entries by hooking the vnode inactive function.

17 Claims, 7 Drawing Sheets

(56) References Cited

U.S. PATENT DOCUMENTS

| | | |
|---|---|---|
| 5,787,427 A | 7/1998 | Benantar et al. |
| 5,842,017 A | 11/1998 | Hookway et al. |
| 5,907,709 A | 5/1999 | Cantey et al. |
| 5,907,860 A | 5/1999 | Garibay et al. |
| 5,926,832 A | 7/1999 | Wing et al. |
| 5,974,149 A | 10/1999 | Leppek |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,587,877 B1 | 7/2003 | Douglis et al. |
| 6,611,925 B1 | 8/2003 | Spear |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 * | 7/2007 | Kaler et al. ............................ 1/1 |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,346,781 B2 | 3/2008 | Cowle et al. |
| 7,349,931 B2 | 3/2008 | Horne |
| 7,350,204 B2 | 3/2008 | Lambert et al. |
| 7,353,501 B2 | 4/2008 | Tang et al. |
| 7,363,022 B2 | 4/2008 | Whelan et al. |
| 7,370,360 B2 | 5/2008 | van der Made |
| 7,406,517 B2 | 7/2008 | Hunt et al. |
| 7,441,265 B2 | 10/2008 | Staamann et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,607,170 B2 | 10/2009 | Chesla |
| 7,657,599 B2 | 2/2010 | Smith |
| 7,669,195 B1 | 2/2010 | Qumei |
| 7,685,635 B2 | 3/2010 | Vega et al. |
| 7,698,744 B2 | 4/2010 | Fanton et al. |
| 7,703,090 B2 | 4/2010 | Napier et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes |
| 7,895,573 B1 | 2/2011 | Bhargava et al. |
| 7,908,653 B2 | 3/2011 | Brickell et al. |
| 7,937,455 B2 | 5/2011 | Saha et al. |
| 7,966,659 B1 | 6/2011 | Wilkinson et al. |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,195,931 B1 | 6/2012 | Sharma et al. |
| 8,234,713 B2 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B2 | 12/2012 | Bhargava et al. |
| 8,381,284 B2 | 2/2013 | Dang et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1 | 7/2002 | Mastin et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0073894 A1 | 4/2003 | Chiang et al. |
| 2003/0074552 A1 | 4/2003 | Olkin et al. |
| 2003/0115222 A1 * | 6/2003 | Oashi et al. .................. 707/200 |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0143749 A1 | 7/2004 | Tajalli et al. |
| 2004/0167906 A1 | 8/2004 | Smith et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2005/0018651 A1 | 1/2005 | Yan et al. |
| 2005/0086047 A1 | 4/2005 | Uchimoto et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |

(56) References Cited

U.S. PATENT DOCUMENTS

| | | |
|---|---|---|
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1* | 6/2006 | Nakamura et al. ........... 369/30.3 |
| 2006/0136910 A1 | 6/2006 | Brickell et al. |
| 2006/0136911 A1 | 6/2006 | Robinson et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2007/0011746 A1 | 1/2007 | Malpani et al. |
| 2007/0028303 A1 | 2/2007 | Brennan |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1* | 5/2007 | Konanka et al. ................. 726/27 |
| 2007/0136579 A1 | 6/2007 | Levy et al. |
| 2007/0143851 A1 | 6/2007 | Nicodemus et al. |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0294703 A1* | 11/2008 | Craft et al. ..................... 707/204 |
| 2008/0301770 A1 | 12/2008 | Kinder |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0113110 A1 | 4/2009 | Chen et al. |
| 2009/0144300 A1* | 6/2009 | Chatley et al. ................ 707/100 |
| 2009/0150639 A1* | 6/2009 | Ohata ........................... 711/172 |
| 2009/0249053 A1 | 10/2009 | Zimmer et al. |
| 2009/0249438 A1 | 10/2009 | Litvin et al. |
| 2010/0071035 A1 | 3/2010 | Budko et al. |
| 2010/0100970 A1 | 4/2010 | Chowdhury et al. |
| 2010/0114825 A1 | 5/2010 | Siddegowda |
| 2010/0250895 A1 | 9/2010 | Adams et al. |
| 2010/0281133 A1* | 11/2010 | Brendel ........................ 709/213 |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1* | 2/2011 | Kobayashi et al. ........... 707/827 |
| 2011/0047543 A1 | 2/2011 | Mohinder |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0119760 A1 | 5/2011 | Sebes et al. |
| 2011/0138461 A1 | 6/2011 | Bhargava et al. |
| 2012/0030731 A1 | 2/2012 | Bhargava et al. |
| 2012/0030750 A1 | 2/2012 | Bhargava et al. |
| 2012/0278853 A1 | 11/2012 | Chowdhury et al. |
| 2012/0290827 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0117823 A1 | 5/2013 | Dang et al. |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |

OTHER PUBLICATIONS

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-service Protection," filed Jan. 29, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

(56) References Cited

OTHER PUBLICATIONS

Eli M. Dow, et al., "The Xen Hypervisor," Informit, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/551,673, entitled "Piracy Prevention Using Unique Module Translation," filed Sep. 1, 2009, Inventor(s): E. John Sebes et al.

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al.

Barrantes et al., "Randomized Instruction Set Emulation to Dispurt Binary Code Injection Attacks," Oct. 27-31, 2003, ACM, pp. 281-289.

Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.

Gaurav et al., "Countering Code-Injection Attacks with Instruction-Set Randomization," Oct. 27-31, 2003, ACM, pp. 272-280.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Tal Garfinkel, et al., "Terra: A Virtual Machine-Based Platform for Trusted Computing," XP-002340992, SOSP'03, Oct. 19-22, 2003, 14 pages.

U.S. Appl. No. 12/844,892, entitled "System and Method for Protecting Computer Networks Against Malicious Software," filed Jul. 28, 2010, Inventor(s) Rishi Bhargava, et al.

U.S. Appl. No. 12/844,964, entitled "System and Method for Network Level Protection Against Malicious Software," filed Jul. 28, 2010, Inventor(s) Rishi Bhargava, et al.

U.S. Appl. No. 12/880,125, entitled "System and Method for Clustering Host Inventories," filed Sep. 12, 2010, Inventor(s) Rishi Bhargava, et al.

U.S. Appl. No. 12/903,993, entitled "Method and System for Containment of Usage of Language Interfaces," filed Oct. 13, 2010, Inventor(s) Rosen Sharma, et al.

U.S. Appl. No. 12/946,344, entitled "Method and System for Containment of Usage of Language Interfaces," filed Nov. 15, 2010, Inventor(s) Rosen Sharma, et al.

U.S. Appl. No. 13/012,138, entitled "System and Method for Selectively Grouping and Managing Program Files," filed Jan. 24, 2011, Inventor(s) Rishi Bhargava, et al.

U.S. Appl. No. 13/037,988, entitled "System and Method for Botnet Detection by Comprehensive Email Behavioral Analysis," filed Mar. 1, 2011, Inventor(s) Sven Krasser, et al.

IA-32 Intel® Architecture Software Developer's Manual, vol. 3B; Jun. 2006; pp. 13, 15, 22 and 145-146.

Notification of International Preliminary Report on Patentability and Written Opinion mailed May 24, 2012 for International Application No. PCT/US2010/055520, 5 pages.

Sailer et al., sHype: Secure Hypervisor Approach to Trusted Virtualized Systems, IBM research Report, Feb. 2, 2005, 13 pages.

U.S. Appl. No. 13/558,181, entitled "Method and Apparatus for Process Enforced Configuration Management," filed Jul. 25, 2012, Inventor(s) Rishi Bhargava et al.

U.S. Appl. No. 13/558,227, entitled "Method and Apparatus for Process Enforced Configuration Management," filed Jul. 25, 2012, Inventor(s) Rishi Bhargava et al.

U.S. Appl. No. 13/558,277, entitled "Method and Apparatus for Process Enforced Configuration Management," filed Jul. 25, 2012, Inventor(s) Rishi Bhargava et al.

* cited by examiner

201 → /usr/foo/bar

202 → vp= VOP_LOOKUP (rootvp, "usr")

203 → vp= VOP_LOOKUP (vp, "foo")

204 → vp= VOP_LOOKUP (vp, "bar")

205 → VOP_DELETE (vp)

260 → fid = nfs_lookup (_fid, "usr")

270 → fid = nfs_lookup (fid, "foo")

280 → fid = nfs_lookup (fid, "bar")

290 → fid = nfs_delete (fid)

File Changes

310 → Who (User Name)

320 → What (File Name)

330 → Where (Computer Name)

340 → How (Program Name)

| | vp (710) | name (720) | path info (730) |
|---|---|---|---|
| 700A → | vp1 | "usr" | "/" |
| 700B → | vp2 | "foo" | "usr/" |
| 700C → | vp3 | "bar" | "/usr/foo/" |
| 700D → | fd1 | "usr" | "/" |
| 700E → | fd2 | "foo" | "usr/" |
| 700F → | fd3 | "bar" | "/usr/foo/" |

| | vp (760) | name (770) | path info (780) |
|---|---|---|---|
| 750A → | vp1 | "usr" | null |
| 750B → | vp2 | "foo" | vp1 |
| 750C → | vp3 | "bar" | vp2 |
| 750D → | fd1 | "usr" | null |
| 750E → | fd2 | "foo" | fd1 |
| 750F → | fd3 | "bar" | fd2 |

Fig. 7B

METHOD OF AND SYSTEM FOR REVERSE MAPPING VNODE POINTERS

RELATED APPLICATIONS

This application claims priority under 35 U.S.C. §119(e) of the co-owned U.S. Provisional Patent Application, Ser. No. 61/124,731 filed Apr. 18, 2008, and entitled "MULTI-LEVEL NAME RESOLUTION," which is hereby incorporated by reference in its entirety.

FIELD OF THE INVENTION

The invention relates to computer software. Specifically, the invention relates to methods of and systems for mapping a vnode pointer within a virtual file system to a file name and its absolute path name.

BACKGROUND OF THE INVENTION

Figure 1:
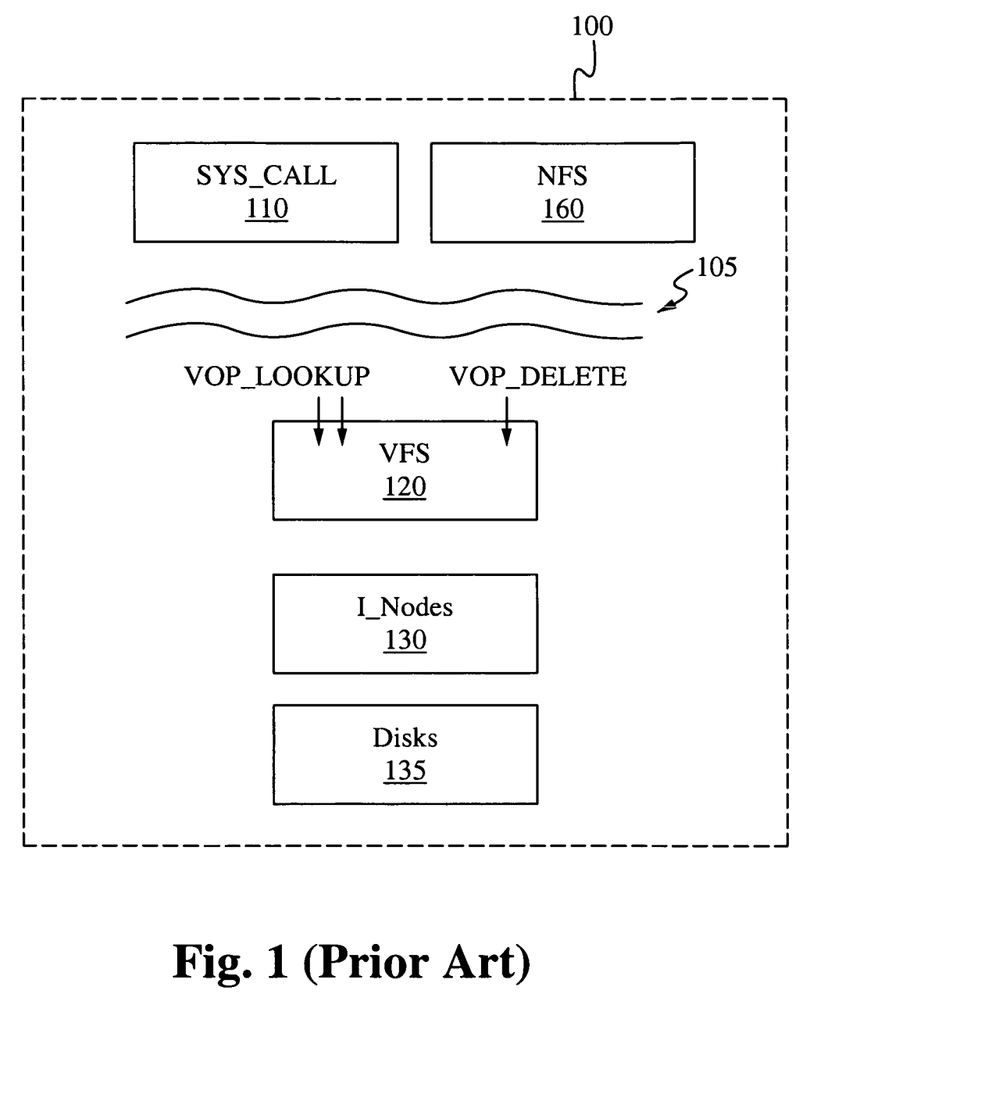
FIG. 1 illustrates a prior art configuration of a file system.

Many computer file systems, are implemented using layers of abstraction including a virtual file system layer using vnodes. This is true for different variants of UNIX including HP-UX, AIX, and Solaris. FIG. 1 shows a file system 100 within a UNIX environment. These systems often lack a means to map or translate a vnode reference to the file name and its absolute path name.

At the top level, the file system provides a system interface for applications or network clients. This layer is shown in FIG. 1, which includes the system call (SYS_CALL) layer 110 and a Network File System (NFS) 160. The system call layer 110 provides a standardized interface for application programs (not shown). As a result, the underlying specifics of the file system can change or be replaced without requiring application modifications.

Below the system call layer 110 and the NFS 160 layer are one or more intermediate layers 105 below which lie the Virtual File System (VFS) layer 120. The VFS layer 120 references files by using vnode pointers. A vnode is a structure that represents a file in the file system 100. A vnode is created and used by the file system to reference a file. When a user attempts to open or create a file, if the VFS containing the file already has a vnode representing that file, a use count in the vnode is incremented and the existing vnode is used. Otherwise, a new vnode is allocated. Below the VFS layer 120 is the inode 130 layer. Inodes represent how files are organized on a disc drive 135.

Most operations within the file system 100 operate at the virtual file system layer and use vnodes or vnode pointers for file functions such as read, write, create, delete, and rename. Thus, extensions, modifications, or additions that hook into the file system 100, also need to operate on vnodes and or vnode pointers.

In this embodiment, the computer system 100 includes a Network File System (NFS) 160. The NFS 160 operates using NFS file handles or file identifiers (fids). Similar to the method by which file names are resolved into a vnode pointers, a file identifier or a NFS file handle for a file name is determined by determining the file identifier or NFS file handle for each directory and for the file name.

Figure 2A:
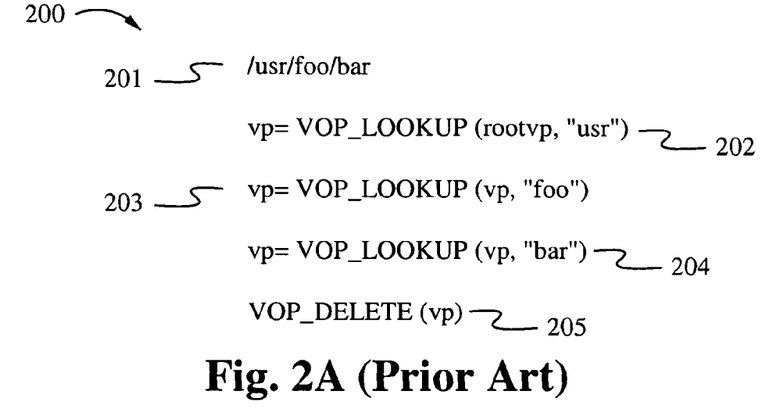
FIG. 2A illustrates prior art pseudo code for resolving a file and path name to a vnode pointer.

FIG. 2A is an example of prior art file system pseudo code 200 for resolving a file name "/user/foo/bar" 201 into a vnode pointer for a file delete operation. The pseudo code 200 is for illustrative purposes. Different operating systems, such as AIX, Solaris, and HP-UX can use different function names and calling parameters from the example shown in FIG. 2A.

In the first step 202, the file system root vnode pointer "rootvp" is used in the VOP_LOOKUP( ) operation to determine the vnode pointer for the "usr" directory name. In a second operation 203, the returned vnode pointer for the "usr" directory name is used by the VOP_LOOKUP( ) operation to determine the vnode pointer for the "foo" directory name. In a third operation 204, the returned vnode pointer for the "foo" directory name is used by the VOP_LOOKUP( ) operation to determine the vnode pointer for the "bar" file name. The returned vnode pointer "vp" is used for the delete operation 205, VOP_DELETE(vp).

Functions such as VOP_DELETE( ) are useful to monitor for file system enhancements such as applications that monitor or control file system changes. However, functions of interest, such as VOP_DELETE, operate on a vnode pointer and accordingly changes in the file system are not directly or easily reported or monitored using an associated file name and an absolute path name. The absolute path name is a string of characters that represents a file system object such as a file, directory, or link. The absolute path name is also referred to as a full path or fully qualified directory path.

When an NFS client (not shown) requests a file operation, the NFS 160 of FIG. 1 performs a set operations similar to the ones used by the system call interface 110. One difference is that the NFS 160 uses file identifiers (fids) or NFS file handles to operate on a file.

Figure 2B:
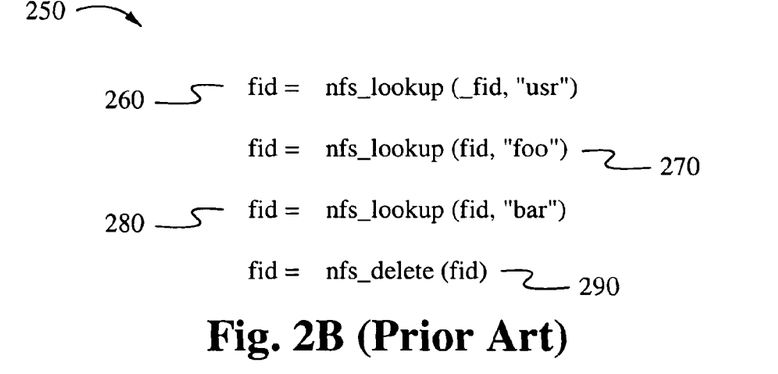
FIG. 2B illustrates prior art pseudo code for resolving a file and path name to a fid.

FIG. 2B illustrates the steps for determining the file identifier for the file /usr/foo/bar. The process 250 begins in the step 260 by looking up the fid for the first directory "usr" in the path name. From the root directory, a "root_fid" or "share_ fid" is used as a known base point identifier for a file system. In the step 270, the fid returned for the "usr" directory is used in an NFS_LOOKUP( ) call to determine the fid for the "foo" directory. In the step 280, the fid returned for the "foo" directory is used in an nfs_lookup( ) call to determine the fid for the "bar" file. In the step 290, the returned fid is used for the file function NFS_DELETE(fid). The NFS_LOOKUP( ) and NFS_DELETE( ) functions represent pseudo code for the functions provided. The function names depend on the version of the UNIX operating system used. Similar steps can be used to resolve a NFS file handle.

Figure 3:
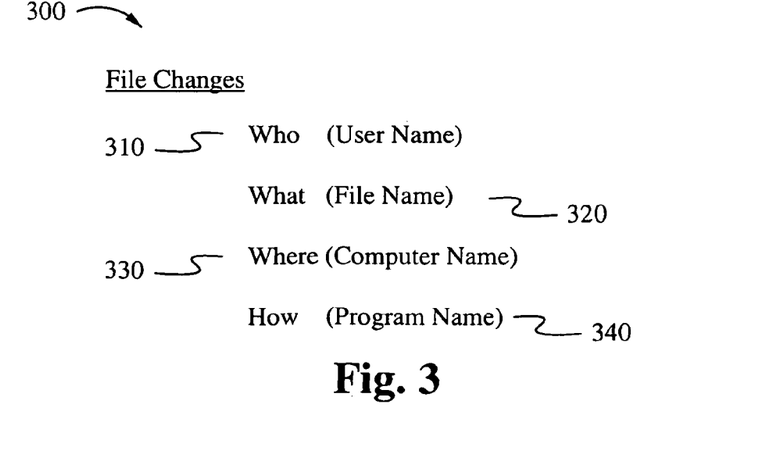
FIG. 3 illustrates the types of information of interest for change tracking and logging in accordance with embodiments of the present invention.

FIG. 3 lists the types of information of interest 300 to an exemplary file change monitoring application that interfaces with the virtual file system. The application monitors and reports "who" 310, "what" 320, "where" 330, and "how" 340 a change is made. The "who" 310 is the login user name that made the change. The "what" 320 is the file name that was changed. The "where" 330 is the computer that made the change, and the "how" 340 is the name of the program that made the change. For determining the "who" 310, "where" 330, and "how" 340, there are known solutions. As described above, it is difficult to determine from a vnode the file name and absolute path name that changed. Applications monitoring file system changes need to operate or report events to an operator based on file names and absolute path names. Reporting changes based on vnodes would be meaningless to a person monitoring system changes. Accordingly, there is a need for the ability to translate a vnode, vnode reference, an NFS file handle or file identifier into an absolute path name.

SUMMARY OF THE INVENTION

In accordance with the present invention a method of and system for providing a reverse name lookup for a file reference is disclosed. A file reference includes a vnode pointer (vp), a NFS file handle, or a file identifier (fid). The present invention is thus advantageous for applications that monitor file changes at a Virtual File System (VFS) level but need to report detected changes in terms of a file name and an absolute path name.

In a first aspect of the present invention, a computer system having a file system that includes a virtual file system abstraction comprising a memory table structure. The memory table structure comprises one or more names within the file system. The names are one of file system directory names and file names as seen and used by a user of the computer system. The names are preferably text, but in other embodiments include the unicode encoding of different languages. Further, the table structure includes one or more file references associated with the virtual file system and, respectively, with the one or more names. Preferably the file reference is a vnode pointer, an NFS file handle, or a file identifier. However, the file reference can include a vnode, an index into a table of vnodes or any other type of indirections to a vnode, NFS file handle, or file identifier. Additionally, the memory table structure holds path name information associated with each of the one or more file references. The path name information is sufficient to generate either an absolute path name or file name and absolute path name to the file name parent directory. In one embodiment, the file references are vnode references, NFS file handles, file identifier references, or a combination thereof. In another embodiment, the one or more names is one of a file name, relative path name and an absolute path name. In another embodiment, the associated path name information is the absolute path name for the file reference. A combination of relative path names and pointers to table names or entries are also contemplated for the path name information.

In a further embodiment, the system further comprises software module configured to intercept a virtual file system vnode, a NFS file handle, or a file identifier name lookup. The one or more names, vnode references, NFS file handle references, file identifier references, and path name information are determined from the intercepted vnode, file handle, or file identifier name lookup. The information from the file name lookup function is used as the source for populating the table structure with one of one or more names, vnode references, and path name information. In a further embodiment, the vnode reference is one of a vnode, a vnode pointer index and wherein the file identifier reference is a file identifier.

In a further embodiment, the system comprises a software module configured to generate either an absolute path name or file name and absolute path name to the file name parent directory in response to receiving an associated vnode reference or an associated file identifier reference.

In a second aspect of the invention, a method of providing in a computer system that includes a virtual file system, either an absolute path name or file name and absolute path name to the file name parent directory from a file reference. The method comprises populating a table structure with a file reference, an associated name, and associated path name information. The table structure holds one or more vnode references, associated names, and associated path name information. The table structure has sufficient information to generate either an absolute path name or file name and absolute path name to the file name parent directory. In one embodiment, the file references are vnode references, NFS file handle references, file identifier references, or a combination of these. In another embodiment, the vnode reference is a vnode, vnode pointer, or an vnode index and the file identifier reference is a file identifier.

In a further embodiment, method further comprises a trapping or intercepting virtual file system references, NFS file handle references, file identifier references, or their combination. The populating the table structure is determined from the vnode reference, NFS file handler, or file identifier name lookup.

In another embodiment, the method further comprises generating either an absolute path name or file name and absolute path name to the file name parent directory from a vnode reference or file identifier reference.

In one embodiment, the name associated with a vnode pointer is one of a file name and a directory name. Preferably the name is a text string that in some embodiments is ASCII but in other embodiments includes unicode characters. In other embodiments the vnode reference is a vnode or a vnode pointer.

In yet another embodiment, the method includes generating either an absolute path name or file name and absolute path name to the file name parent directory from a vnode reference or file identifier reference.

In a further embodiment, the method further comprises converting the vnode reference to a file identifier upon trapping a virtual file system vnode release or inactivate VOP_INACTIVE function call. The table structure is further populated with the file identifier, file name associated with the released or inactivated vnode, the associated path name information, and any other information required to determine an absolute path name. The table structure also holds one or more file identifier structures, associated names, and associated absolute or relative path name information. The table structure associated with the file identifier has sufficient information to generate an absolute path name or file name and absolute path name to the file name parent directory.

In another aspect of the invention, a computer device comprises a computer-readable storage medium bearing computer executable code thereon for generating in a computer system that includes a virtual file system, either an absolute path name or file name and absolute path name to the file name parent directory from a file reference. The computer device comprises a program module configured to populate a table structure with a file reference, an associated name, and associated path name information. The table holds one or more file references, names, and path name information, associated with the file references. The table structure has sufficient information to generate either an absolute path name or file name and absolute path name to the file name parent for each file reference in the table.

In one embodiment of the present invention, the computer device further comprises a program module programmed to intercept virtual file system file reference name lookup, wherein the populating the table structure with the file reference, the associated name, and the associated path name information is determined from the file reference name lookup.

In a further embodiment, the file reference is a vnode reference, a file identifier reference, or a combination thereof. In another embodiment, each of the associated names is one of a file name, relative path name, and an absolute path name.

In another embodiment, the computer device includes a software module configured to generate either an absolute path name or file name and absolute path name to the file name parent directory a name and an associated absolute path name in response to receiving a vnode reference or a file identifier reference. In a further embodiment, the computer device vnode reference is one of a vnode, a vnode pointer, a vnode index and wherein the file identifier reference is a file identifier.

BRIEF DESCRIPTION OF THE DRAWINGS

Embodiments of the invention are better understood by reading the following detailed description in conjunction with the accompanying drawings.

DETAILED DESCRIPTION OF THE INVENTION

The following descriptions are provided as an enabling teaching of embodiments of the invention. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances, and are a part of the present invention.

The present invention provides for applications or functions that monitor or otherwise operate on vnodes, the capability to report or perform logical operations using the file name and absolute path name associated with a vnode. Without this capability, the reporting of changes would occur using vnodes which provide no useful information on their own. Accordingly, the present invention provides applications the capability to map a vnode, a potentially changing and operator meaningless value, to a file and absolute path name which is useful to operators or applications that deal with files on an absolute or relative path name basis.

In accordance with one embodiment of the invention, a file system includes a Reverse Name Lookup Cache (RNLC) for translating vnode pointers and file identifiers into a file name and an absolute path name. Data for the RNLC is found by intercepting specific system function calls to the virtual file system. The functions intercepted include the virtual file system functions such as VOP_DELETE, VOP_CREATE, VOP_RENAME, VOP_LOOKUP, and VOP_INACTIVE. Each of these functions operates on a vnode pointer (vp). In order to report file changes on a basis that a human operator can understand, i.e. in terms of a file name and absolute path name, an RNLC function is provided for translating a vnode pointer to a file name and an absolute name.

Figure 4:
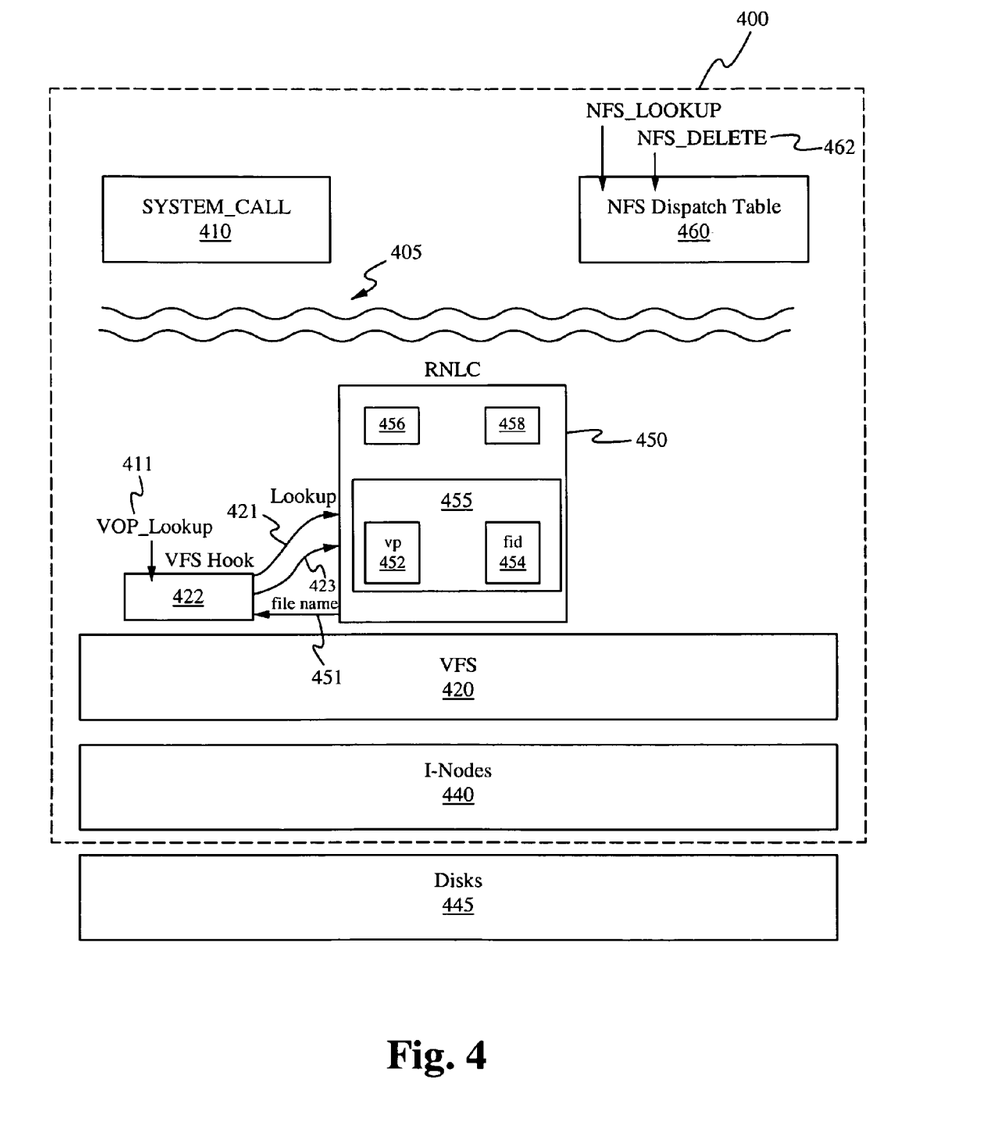
FIG. 4 illustrates a file system supporting both a system call interface and a Network File System with a Reverse Name Lookup Cache (RNLC) or table in accordance with one embodiment of the present invention.

FIG. 4 is a block diagram of components of the computer operating system 400 including the virtual file system 420 and 440 in accordance with one embodiment of the present invention. The computer system 400 comprises a SYSTEM_CALL module 410 with its associated interface functions, an NFS Dispatch Table module 460 that includes the interface functions with the network protocol stack, other layers of abstraction 405, a Virtual File System layer 420 (VFS), hook or intercept module 422, I-nodes 440, disk drives 445, and an RNLC module 450. The computer file system 400 has hooks 422 are in the execution path between (a) the SYSTEM_CALL 410 and the NFS Dispatch Table module 460 and (b) the VFS layer 420.

The computer system 400 is configured to provide additional file system features such as file change monitoring as part of the hook or intercept modules 422. The additional features that are provided by the VFS hooks 422 include intercepting and processing a subset of the calls into the VFS layer 420. In one embodiment, these functions include the pseudo functions VOP_DELETE, VOP_CREATE, VOP_RENAME, VOP_LOOKUP, and VOP_INACTIVE. While FIG. 4 shows only a subset of the functions being hooked, other embodiments can hook more or fewer VFS layer 420 functions calls.

The RNLC 450 comprises a module 456 that performs the function of populating the table structure 455 with vnode references, fid structures, file names, and absolute or relative path information. Further, the RNLC 450 includes a translation module 458 that performs the function of generating a file name with absolute path information based on a provided vnode pointer or fid.

The table structure 455 is organized into a vp (vnode pointer) table 452 and a fid table 454. Each vp entry in the vp table 452 comprises a vnode reference, a name, and absolute path information associated with the vnode. Each fid entry in the fid table 454 comprises a fid structure, a name, and absolute path information associated with the fid. An example of the table structure 455 is further described below in the discussions of FIGS. 7A and 7B. The vnode reference in some embodiments is a vnode pointer which is a direct reference to a vnode. In other embodiments, the table structure can include NFS file handles and associated reference information to vnodes and path information. In further embodiments it is an indirect reference or any other means to reference a vnode. Examples of other indirect references to a vnode include using uniquely identifying vnode metadata, hashes of uniquely identifying vnode data, using a hash of the vnode pointers, using a hash of file identifiers, or using an index into a list of pre-allocated vnodes. Each name entry in the vp table 452 or fid table 454 represents a directory or a file name for the vnode. The name information is used to generate a fully qualified path of the parent directory. In one embodiment, the name information is the absolute path name. In other embodiments, the path information is linkage information for determining one level of the absolute path name. This includes linkages or references to one or more table entries that contain all or part of the absolute path name. Examples of these tables are discussed below and shown in FIGS. 7A and 7B. The fid table entries are similarly organized.

The NFS Dispatch table module 460 operates differently from the system_call module 410 since in using the NFS module 460, files might not be explicitly opened to perform file I/O. To perform an NFS operation on a file, the NFS server first receives a command over the network and the file identifier or NFS file handle to operate on. The file identifier or NFS file handle is then used to obtain a vnode via the VNODE_FROM_FID( ) pseudo-API. The actual file system operation is performed by passing the vnode to the appropriate VOP routine. Finally, the vnode is released which may cause VOP_INACTIVE( ) to be called. Depending on the operation, more arguments may be sent with the command which are in turn passed to the VOP routine, but the workflow is the same.

The nfs_lookup( ) operation also differs significantly. When an nfs_lookup( ) call is made, the NFS server first receives the lookup command, a file identifier or file handle representing the directory in which the lookup is to be performed and a file name. The file identifier or file handle is used to obtain a directory vnode via the VNODE_FROM_FID( ) pseudo-API. Then the directory vnode is passed to VOP_LOOKUP( ) along with the file name to obtain a vnode to the desired file. The VNODE_TO_FID( ) pseudo-API is then called to obtain a file identifier from the desired file's vnode. Both the directory vnode and the desired file's vnode are then released which may cause VOP_INACTIVE( ) to be called for either vnode or both. Finally, the desired file's file identifier or NFS file handle is sent back to the NFS client.

This presents an issue for any application that needs to look up the absolute path name using the RNLC 450: the NFS dispatch table module 460 releases the vnode pointer after performing an NFS_lookup function. To keep the RNLC tables from growing indefinitely, the RNLC 450 also removes the vnode pointer from the table structure 455. Accordingly, a vnode pointer will not be found that can resolve the NFS fid to a file and absolute path name. Thus, if a file of interest is being monitored, it is not possible to report the change in terms of a name and absolute path name.

When attempting a delete operation, the NFS dispatch table module 460 performs a VNOD_FROM_FID( ) operation to obtain a vnode. It is the new vnode that is used to perform a delete operation. Because this operation is performed without performing a VOP_LOOKUP operation, the new vnode pointer is not found in the vp table 452.

To handle the above described problem of vnodes not being found in the vp table 452, a fid table 454 is included as part of the table structure 455. When a vnode is to be removed from the VFS layer 420, the function VOP_INACTIVE( ) is called to release the vnode. The VOP_INACTIVE( ) function is intercepted (hooked) to intercept function calls to release vnodes. When VOP_INACTIVE( ) is called, the fid for the vnode pointer is determined and stored with the associated information for the name and absolute path name in the fid table entries 454 of the table structure 455.

Figure 5:
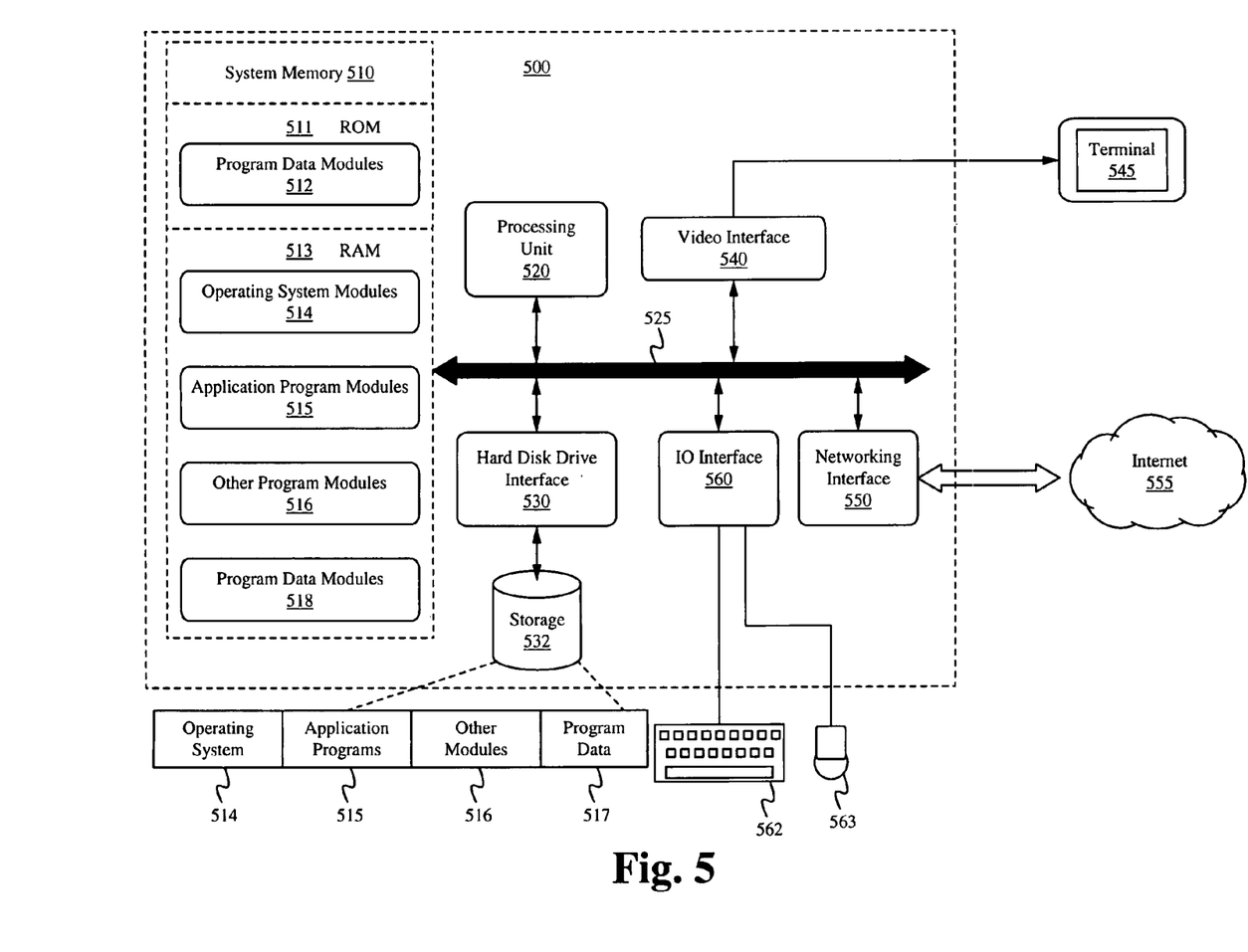
FIG. 5 illustrates a block diagram of an exemplary computing device suitable to implement a method for populating a reverse name lookup table in accordance with one embodiment of the present invention.

FIG. 5 shows a computer system 500 in accordance with one embodiment of the invention. The computer system 500 is configured to execute the Reverse Name Lookup Cache (RNLC) method 600 of FIG. 6A. The computer system 500 includes one or more processors or processing units 520, a system memory 510, and a bus 525 that couples various system components, including the system memory 510, to the processor 520.

The bus 525 represents one or more of any of several types of bus structures, including a memory bus or memory controller, a peripheral bus, an accelerated graphics port, and a processor or local bus using any of a variety of bus architectures. The system memory 510 includes read only memory (ROM) 511 and random access memory (RAM) 513. A basic input/output system (BIOS) 512, containing the basic routines that help to transfer information between elements within the computer system 500, such as during start-up, is stored in ROM 511. The computer system 500 further includes a storage device 532 for reading from and writing to a hard disk (not shown) connected to the bus 525 via a hard disk drive interface 530 (e.g., a SCSI, ATA, or other type of interface). Additionally, removable recording media are contemplated, including a magnetic disk drive (not show) for reading from and writing to a removable magnetic disk (not shown), connected to bus 525 via a magnetic disk drive interface (not shown); and an optical disk drive (not shown) for reading from and/or writing to a removable optical disk such as a CD ROM, DVD, or other optical media, connected to the bus 525 via an optical drive interface (not shown). The drives and their associated computer-readable media provide non-volatile storage of computer readable instructions, data structures, program modules and other data for the computer system 500. Although the exemplary environment described herein employs a hard disk, it will be appreciated by those skilled in the art that other types of computer-readable media which can store data that is accessible by a computer, such as magnetic cassettes, flash memory cards, random access memories (RAMs), read only memories (ROM), and the like, may also be used in the exemplary operating environment.

A number of program modules are stored on the storage 532, magnetic disk, optical disk (not shown), ROM 511, or RAM 513, including an operating system 514 having a file system with a virtual machine abstraction, one or more application programs 515 that can include a File Change Monitoring application, other program modules 516, and program data modules 518. A user may enter commands and information into the computer system 500 through input devices such as a keyboard 562 and a pointing device 563. Other input devices (not shown) may include a microphone, joystick, game pad, satellite dish, scanner, or the like. These and other input devices are connected to the processing unit 520 through an interface 560 that is coupled to the system bus 525 (e.g., a serial port interface, a parallel port interface, a universal serial bus (USB) interface, etc.). A terminal 545 or other type of display device is also connected to the system bus 525 via an interface, such as a video interface 540. In addition to the terminal 545, personal computers typically include other peripheral output devices (not shown) such as speakers and printers.

Figure 6A:
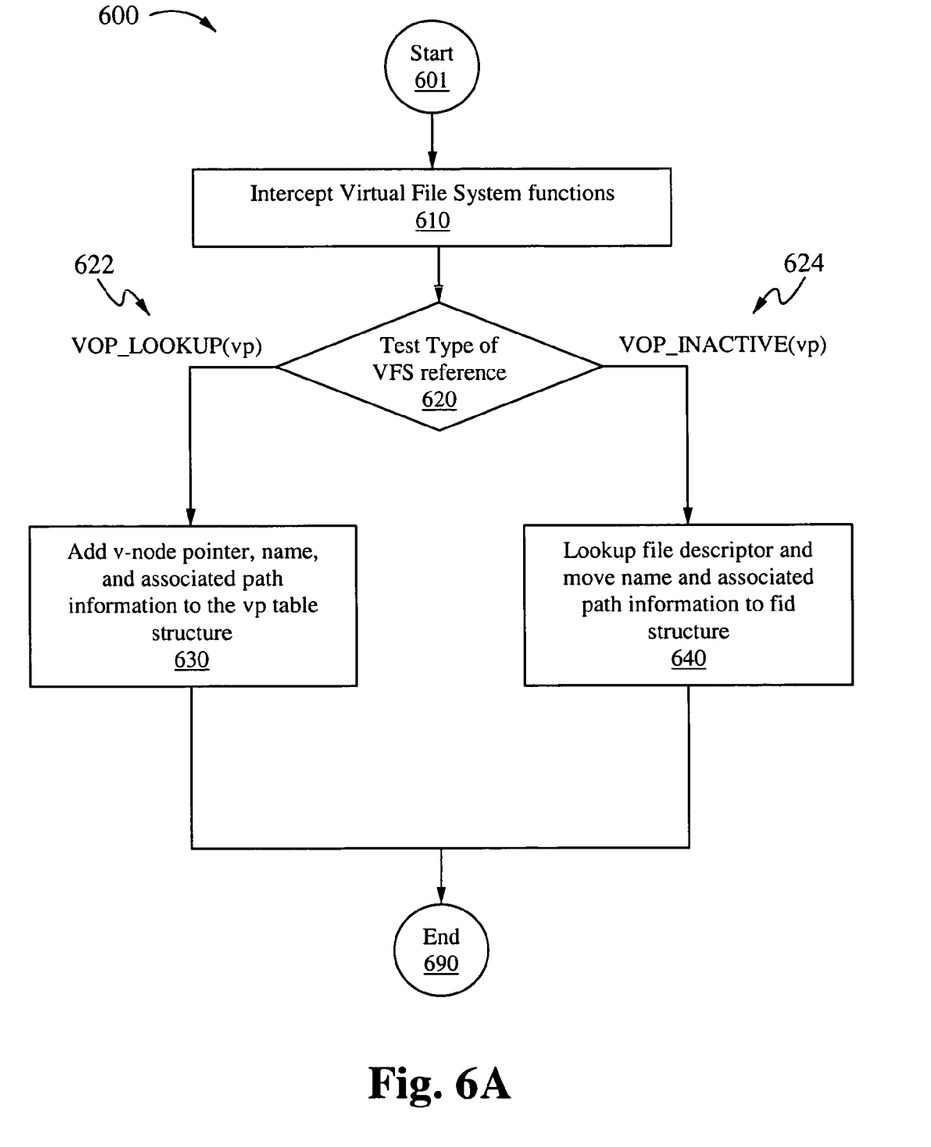
FIG. 6A illustrates the steps to populate reverse name lookup table in accordance with one embodiment of the present invention.

FIG. 6A illustrates the steps of a method of populating a table structure 600 used for the reverse name lookup of a vnode reference in accordance with one embodiment of the invention. A vnode reference can be a vnode structure, an indirect reference to a vnode, or preferably a pointer to a vnode.

The method begins at a start step 601. The step 601 can include initialization of variables, software states, and hardware. In the step 601 a hook is inserted into the execution path of calls to the virtual file system to capture some or all of the functional calls.

In a step 610, a call to the virtual file system is intercepted by code in the execution path of the virtual file system. Two particular functions of interest are represented by the pseudo code names VOP_LOOKUP 622 and VOP_INACTIVE 624.

In the step 620, the method determines the type of VFS function call that is made. This determination can be made by different components or combination of components. If the implementation of the functional calls to the VFS are in a single module, the code for performing the step 620 is placed in this module. If the implementation of the interface is through multiple modules, the code for performing the step 620 can be placed in each of the multiple modules.

Figure 7A:
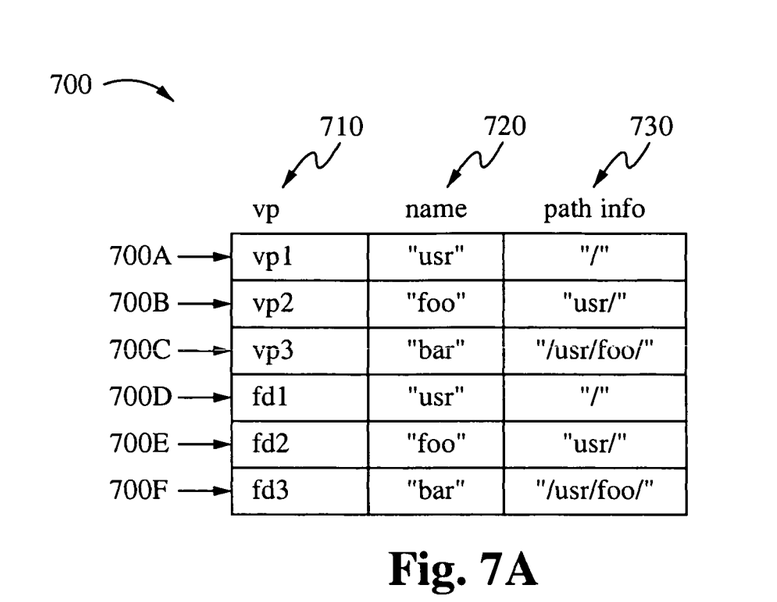
FIGS. 7A and 7B illustrate an RNLC table in accordance with embodiments of the present invention.
Figure 7B:
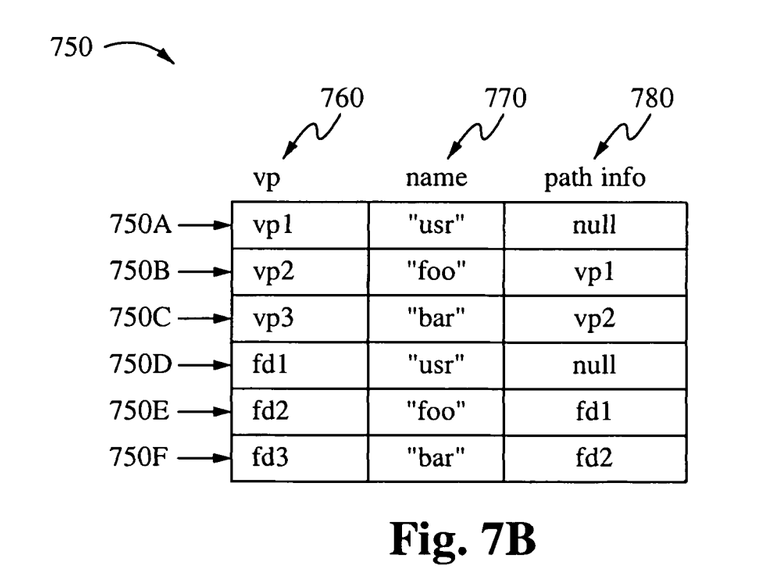

If in the step 620 it is determined that the VFS function is a VOP_LOOKUP(vp, "name") function call, then the returned vnode pointer, the name, and the absolute path information associated with the vp are stored in the table structure 455 of FIG. 4 in the step 630. In one embodiment, the absolute path information is the vp that was used to get the vnode information. In another embodiment, this information is a pointer to the table structure entry that contains information about the directory in which the name is found. This relationship can be used to form a link from file to directory, and to the next directory, and on up to the root directory, thereby providing sufficient information for generating the absolute path name. FIG. 7B shows such a table in accordance with one embodiment of the invention. In another embodiment, for each vnode reference in the table, the absolute path name is determined and stored with the vnode reference in the table structure as shown in FIG. 7A.

If in the step 620, it is determined that the VFS function 620 is a VOP_INACTIVE(vp) function call, the method continues to the step 640. The VOP_INACTIVE function call may indicate Network File System (NFS) activity. The reason for this is that the NFS_LOOKUP function uses a directory fid in a VOP_LOOKUP( ) function to determine a vnode pointer. The vnode pointer is used to resolve the fid for the file name. Then the determined vnode pointer is made inactive. Subsequent NFS operations use the fid in subsequent operations. The VP_INACTIVE( ) function is intercepted so that the determined fid for the vnode and the associated information are stored in the fid table 454 of FIG. 4. Thus, the table structure can provide an absolute path name and file name for a referenced file identifier (fid).

From both steps 630 and 640, the process proceeds to the step 690, in which it ends. In the step 690, any required memory management cleanup or reconfiguration is performed. Alternatively or additionally, the step 690 performs caching functions such as removing the least recently used vnode references if the cache size exceeds a threshold. Also, the fids in the table structure 455 of FIG. 4 can be managed as a cache and the least recently used fid and associated information removed if the number of entries exceeds a threshold.

The method described above is simplified. In other embodiments, there can be additional virtual file system functions that are intercepted and other information extracted and stored in the table structure that is important to the determination of the file name and absolute path name for a vnode.

Figure 6B:
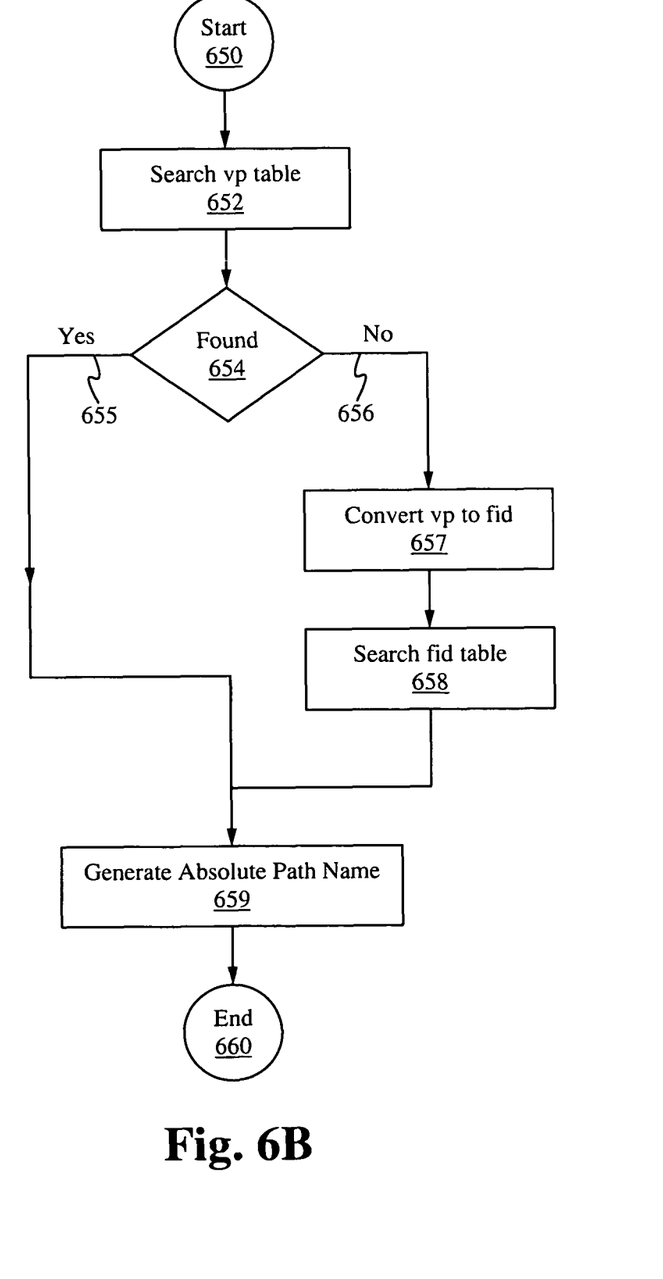
FIG. 6B illustrates the steps to determine the file name an absolute path name in accordance with one embodiment of the present invention.

FIG. 6B illustrates the steps of a process of determining the file name and absolute path name for a vnode pointer in accordance with one embodiment of the invention.

The process begins at a start step 650. The step 650 can include initialization of variables, software states, and any required hardware initialization. The method is given a vnode pointer for which the corresponding file name and absolute path name is to be determined. The process also contemplates determining a partial path name. Referring to FIG. 4, the step searching the vp table 652 searches for the matching vp within the vp table 452. Any standard search algorithm that appropriate for the table organization can be used. A decision is made 654 based on finding or not finding the vnode pointer. If the vnode pointer is found in the vp table the process proceeds to the step 659. If the vnode pointer is not found, then the process proceeds to step 657.

In the step 657 the vp is converted to a fid. The fid is provided to the next step 658 which searches the fid table for a matching fid. The search can be any method that is appropriate for the organization of the fid table 454. The process proceeds to a step 659 where the table reference for for the matching fid is used to determine the file name and absolute path name.

In a step 659, the vp or fid table reference to either the matching vnode pointer or matching fid is used to determine the file name, or absolute path name. The process proceeds to an ending step 660. This step can include any required memory clean up and returning the determined file name and absolute path name.

FIGS. 7A and 7B are two example implementations of a memory resident the table structure 700 and 750 of the table structure of 455 of FIG. 4, in accordance with embodiments of the invention. The table structure 700 has 6 rows 700A-F, each with 3 elements: vp or fd in the first column 710, a name element 720, and path information 730. Using (row, column) pairs to refer to the elements in table 700, the vp1 element (700A, 710) corresponds to the "usr" (700A, 720) in the "name" column 720. The elements in the "name" column 720 are one of a directory name, and a file name. The elements (700A-C, 730) in the path information column 730 comprises a text string with the complete absolute path name. In the first row 700A, the "path info" (700A, 730) for the "usr" (700A, 720) directory is "/". For vp2 (700B, 710), the associated absolute path name (700B, 730) for "foo" (700B, 720) is "usr/". For the file "bar" the full absolute path name (700C, 730) is "/usr/foo/". The same relationship between the file identifier elements (700D-F, 710) and the name element (700D-F, 720) and the "path info" elements (700D-F, 730) holds true.

Referring to FIG. 7B, the first two columns 760 and 770 have the same elements 710 and 720 as in FIG. 7A. The path information column 780 is implemented with a different structure. In the first row 750A, the "path info" (750A, 780) is a null value indicating a root directory. In the second row 750B, the "path info" (750B, 780) is "vp1", the vnode pointer for the first row. Thus, to generate the absolute path name for the second row vnode (750B, 760) "vp2", the vp1 vnode pointer (750A, 760) is located, and the name element (750A, 770) "usr" is pre-appended to the path information (750B, 770) "foo" with the required directory slashes, which forms the absolute path name "/usr/foo". For the third row 750C, the absolute path is generated by using the path information (750C, 780) to locate the vp2. The "name" element of vp2 (750B,770) forms the directories in the absolute path name. The path info (750B, 780) for the vp2 is used in the same manner to determine the rest of the absolute path name. The two configurations of the table structures 700 and 750 are for illustrative purposes. The two table configurations are illustrative of sufficient information for generating a file name and absolute path name for a vnode pointer. Other embodiments of a table structure are contemplated. The path info (750A-F) can comprise pointer, indexes, or other information sufficient to build an absolute path name for the vnode pointer, NFS file handle, or file identifier.

Referring again to FIG. 4, in operation the RNLC 450 is used in support of file system applications or modifications to the file system that need to translate vnode pointers, fids, or both to file names and absolute path names. In one example, an application (not shown) makes a call to the virtual file system 420 to open the file. The application communicates with the virtual file system 420 through the SYSTEM_CALL module 410. A call to open the file "/usr/foolbar" results in a series for VOP_LOOKUP calls 411 to the VFS layer 420 to resolve the vnode for each directory in the absolute path name and file name.

The file system 400 is configured with a hook 422 in the functional path between the SYSTEM_CALL module 410 and the VFS layer 420. The hook 422 intercepts some or all of the function calls to the VFS layer 420. In some embodiments, the hook 422 is part of or coupled to an application that monitors changes to files within the computer system (not shown). The information used in the VOP_LOOKUP 411 function call is captured and used to populate the vp table 452 of the table structure 455. Populating the vp table 452 is controlled by a function 456 which is part of the RNLC 450. The vnode pointer is used to populate the vp table 452 with the associated name and associated path information. The VOP_LOOKUP 411 is passed on to the VFS layer 420 which returns a vnode pointer for use by the file system 400.

The system monitoring application, which in the shown embodiment is part of the VFS hook module 422, utilizes the RNLC 450 to translate a vnode or vnode pointer to a file name and an absolute path name. The translation is performed by a function call 421 to the RNLC 450. The call invokes the translation function 456.

The translation module 456 of the RNLC 450 searches the vp table 452 to find the requested vnode pointer. The organization of the vp's within the table can follow any common know organizational scheme for fast lookup. Once the vp is found, the associated name and absolute path name information are generated and returned 451.

If the hook 422 intercepts a VOP_INACTIVE function call to the VFS 420, then the associated vp is converted to a fid using a virtual file system function, referred to here as VOP_2_FID(vp), and transferred to the fid table 454 along with the associated name and absolute path information.

If an NFS operation occurs, such as an NFS_DELETE 462, an NFS operation using a fid is generated. The fid is turned into a vp. However, the vp generation step does not utilize the VOP_LOOKUP call and accordingly the vp will not be loaded into the vp table 452. When a request for a translation of a vp occurs, and if the vp is not found, the translation module 458 searches the fid table 454 to find the fid corresponding to the requested vp. The fid table 454 is used to generate an associated name and absolute path name for the fid. The RNLC 450 includes a module 458 for converting a vp or fid into an absolute path name.

In some embodiments, all functions discussed are stored in computer-readable media containing computer-executable instructions and a processor for executing the functions.

Reference has been made in detail to the preferred and alternative embodiments of the invention, examples of which are illustrated in the accompanying drawings. It will be readily apparent to one skilled in the art that other modifications may be made to the embodiment without departing from the spirt and scope of the invention as defined by the appended claims. The invention is intended to cover alternatives, modifications and equivalents, which can be included within the spirit and scope of the invention. Furthermore, in the detailed description of the present invention, numerous specific details have been set forth in order to provide a thorough understanding of the present invention. However, it should be noted that the present invention can be practiced without these specific details. In other instances, well known methods, procedures and components have not been described in detail so as not to unnecessarily obscure aspects of the present invention.

What is claimed is:

1. Logic encoded in a non-transitory computer-readable storage medium and, when executed by a computer processor, is operable to perform operations of reverse mapping virtual node (vnode) pointers, comprising:
   using a reverse name lookup cache (RNLC) to translate vnode pointers and file identifiers into file names and absolute path names, the operations comprising:
      intercepting a first function call into a virtual file system layer, wherein the first function call includes a first name of a file and first path name information associated with a first file reference of the file, and wherein the first intercepted function call is processed in the virtual file system layer to return the first file reference;
      populating a first entry of a table structure with the first file reference, the first name, and the first path name information, wherein the table holds one or more file references, names, and path name information, wherein
         one or more entries in the table structure have sufficient information to determine an absolute path name to the file,
         the table structure is organized into a vnode pointer (vp) table and a file identifier (fid) table, wherein each vp entry in the vp table comprises a vnode reference and absolute path information associated with a corresponding vnode, and
         each fid entry in the fid table comprises a file structure and absolute path information associated with a corresponding fid; and
      converting a particular vnode reference to a particular file identifier upon trapping a function call inactivating a corresponding vnode, wherein the table structure is further populated with a particular file name associated with the corresponding inactivated vnode.

2. The logic of claim 1, wherein the one or more file references in the table structure are vnode references, Network File System (NFS) file handles, file identifier references, or a combination thereof.

3. The logic of claim 2, further comprising:
   the determining the absolute path name to the file from at least one of the vnode references or at least one of the file identifier references in the table structure.

4. The logic of claim 1, wherein the processor is operable to perform further operations comprising:
   intercepting a second function call into the virtual file system layer, wherein the second function call is intercepted before the first function call, wherein the second function call includes a second name of a directory of the file and second path name information associated with a second file reference of the directory, and wherein the second intercepted function call is processed in the virtual file system layer to return the second file reference; and
   populating a second entry of the table structure with the second file reference, the second name, and the second path name information.

5. A method for reverse mapping virtual node (vnode) pointers comprising:
   using a reverse name lookup cache (RNLC) to translate vnode pointers and file identifiers into file names and absolute path names, the operations comprising:
      intercepting a first function call into a virtual file system layer, wherein the first function call includes a first name of a file and first path name information associated with a first file reference of the file, and wherein the first intercepted function call is processed in the virtual file system layer to return the first file reference;
      populating a first entry of a table structure with the first file reference, the first name, and the first path name information, wherein the table holds one or more file references, names, and path name information, wherein
         one or more entries in the table structure have sufficient information to determine an absolute path name to the file,
         the table structure is organized into a vnode pointer (vp) table and a file identifier (fid) table, wherein each vp entry in the vp table comprises a vnode reference and absolute path information associated with a corresponding vnode, and each fid entry in the fid table comprises a file structure and absolute path information associated with a corresponding fid; and converting a particular vnode reference to a particular file identifier upon trapping a function call inactivating a corresponding vnode, wherein the table structure is further populated with a particular file name associated with the corresponding inactivated vnode.

6. The method of claim 5, wherein the one or more file references in the table structure are vnode references, Network File System (NFS) file handles, file identifier references, or a combination thereof.

7. The method of claim 5, further comprising: determining the absolute path name to the file from at least one of the vnode references or at least one of the file identifier references in the table structure.

8. The method of claim 5, further comprising:
intercepting a second function call into the virtual file system layer, wherein the second function call is intercepted before the first function call, wherein the second function call includes a second name of a directory of the file and second path name information associated with a second file reference of the directory, and wherein the second intercepted function call is processed in the virtual file system layer to return the second file reference; and populating a second entry of the table structure with the second file reference, the second name, and the second path name information.

9. The method of claim 8, wherein the absolute path name to the file is determined from the first name and an absolute path name to the directory.

10. The method of claim 5, wherein the first path name information includes one of the absolute path name to the file or a linkage to one or more other entries in the table structure containing at least part of the absolute path name to the file.

11. The method of claim 5, wherein the first function call is a vnode lookup operation with a first name parameter representing the file, wherein the vnode lookup operation returns a vnode pointer for the file, and wherein the first file reference stored in the first entry is a vnode reference representing the vnode pointer for the file.

12. The method of claim 5, wherein the first function call is a vnode release operation with a first vnode parameter, wherein a file identifier corresponding to the first vnode parameter is determined, and wherein the first file reference stored in the first entry of the table structure is a file identifier reference representing the corresponding file identifier.

13. A computer device for reverse mapping virtual node (vnode) pointers comprising:
a table structure configured to store one or more entries, each entry including a file reference, a name, and path information;
a program module for populating the table structure; and
one or more computer processors operable to execute operations associated with the table structure and the program module using a reverse name lookup cache (RNLC) to translate the vnode pointers and file identifiers into file names and absolute path names, the operations comprising:
intercepting a first function call into a virtual file system layer, wherein the first function call includes a first name of a file and first path name information associated with a first file reference of the file, and wherein the first intercepted function call is processed in the virtual file system layer to return the first file reference; and
populating a first entry of the table structure with the first file reference, the first name, and the first path name information, wherein
one or more entries in the table structure have sufficient information to determine an absolute path name to the file,
the table structure is organized into a vnode pointer (vp) table and a file identifier (fid) table, wherein each vp entry in the vp table comprises a vnode reference and absolute path information associated with a corresponding vnode, and
each fid entry in the fid table comprises a file structure and absolute path information associated with a corresponding fid; and
converting a particular vnode reference to a particular file identifier upon trapping a function call inactivating a corresponding vnode, wherein the table structure is further populated with a particular file name associated with a the corresponding inactivated vnode.

14. The computer device of claim 13, wherein the first file reference is a vnode reference, a Network File System (NFS) file handle, or a file identifier reference.

15. The computer device of claim 14, wherein the one or more processors are operable to perform further operations comprising:
the determining the absolute path name to the file in response to receiving a vnode reference or a file identifier reference.

16. The computer device of claim 13, wherein the one or more processors are operable to perform further operations comprising:
intercepting a second function call into the virtual file system layer, wherein the second function call is intercepted before the first function call, wherein the second function call includes a second name of a directory of the file and second path name information associated with a second file reference of the directory, and wherein the second intercepted function call is processed in the virtual file system layer to return the second file reference; and
populating a second entry of the table structure with the second file reference, the second name, and the second path name information.

17. The computer device of claim 16, wherein the absolute path name to the file is determined from the first name and an absolute path name to the directory.

* * * * *